US011025688B1

(12) United States Patent
Ijjurouthu et al.

(10) Patent No.: US 11,025,688 B1
(45) Date of Patent: Jun. 1, 2021

(54) AUTOMATED STREAMING DATA PLATFORM

(71) Applicant: Capital One Services, LLC, McLean, VA (US)

(72) Inventors: Haranatha Ijjurouthu, Irving, TX (US); Gopi Kancharla, Frisco, TX (US); Prasad D. Sangle, Glen Allen, VA (US); Ranga Rao Surineedi, Glen Allen, VA (US); Rama Mohan Boppana, Glen Allen, VA (US); Jordan Tyler Hale, Henrico, VA (US); Richard Morrisey, Richmond, VA (US); Pallavi Desai, Herndon, VA (US); William Scott Cochran, Henrico, VA (US); William Thomas Lyne, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/850,657

(22) Filed: Apr. 16, 2020

(51) Int. Cl.
*H04L 29/06* (2006.01)
*G06F 16/2455* (2019.01)
*G06F 16/27* (2019.01)

(52) U.S. Cl.
CPC .... *H04L 65/4069* (2013.01); *G06F 16/24568* (2019.01); *G06F 16/27* (2019.01); *H04L 63/08* (2013.01)

(58) Field of Classification Search
CPC .................................................. H04L 65/4069
See application file for complete search history.

(56) References Cited

U.S. PATENT DOCUMENTS

| | | | |
|---|---|---|---|
| 8,732,302 B2 | 5/2014 | Jorgenson et al. | |
| 8,949,810 B2 | 2/2015 | Andrade et al. | |
| 9,081,870 B2 | 7/2015 | Sax et al. | |
| 9,276,959 B2* | 3/2016 | Theimer | H04L 63/20 |
| 9,948,521 B2 | 4/2018 | Doraiswamy et al. | |
| 9,973,558 B2 | 5/2018 | Kekre et al. | |
| 10,601,881 B1* | 3/2020 | Ghare | H04L 69/04 |
| 10,630,746 B1* | 4/2020 | Shen | H04N 21/26258 |
| 2011/0295939 A1 | 12/2011 | Andrade et al. | |
| 2014/0047485 A1* | 2/2014 | Shaw | H04W 48/16 725/62 |
| 2014/0173594 A1* | 6/2014 | Ng | H04N 21/4516 718/1 |
| 2017/0289240 A1* | 10/2017 | Ghare | H04L 67/10 |
| 2018/0074852 A1 | 3/2018 | Bishop et al. | |
| 2018/0367579 A1* | 12/2018 | Kolan | H04L 65/4069 |
| 2021/0021653 A1* | 1/2021 | Mercier | H04L 65/4069 |

* cited by examiner

*Primary Examiner* — Shean Tokuta
(74) *Attorney, Agent, or Firm* — Banner & Witcoff, Ltd.

(57) ABSTRACT

Aspects described herein generally improve the quality, efficiency, and speed of data processing by automatically generating a plurality of nodes for a streaming data platform based on user parameters. This combination of different platform nodes may allow for the generation and initiation of a streaming platform that may run in a cloud and may provide multi-availability-zone and multi-region capabilities to support replication and disaster recovery capabilities for data management. The streaming platform may include a coordination layer, a streaming layer, and a replication layer, and each layer may include a plurality of nodes.

20 Claims, 7 Drawing Sheets

AUTOMATED STREAMING DATA PLATFORM

FIELD OF USE

Aspects of the disclosure relate generally to data processing and more specifically to the automatic generation of streaming data message processing systems.

BACKGROUND

The computing world is developing an increasing number of data sources. These data sources may be tied to a wide variety of sources, such as web sites, physical devices that are part of the Internet of things (IoT), network trafficking devices, and system state monitors for and alarms. The need for processing data from such data sources leads to an increasing need to create system to handle the high volumes of data as fast as possible so that the end users can be provided with the necessary data. However, the generation of streaming platforms may generally require significant human resources to determine system requirements and set up the platform to begin processing data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for automatic generation and initiation of a streaming platform that can reliably process message data in the cloud. This may have the effect of enabling the automatic generation of a scalable, resilient enterprise streaming data solution. According to some aspects, these and other benefits may be achieved by automatically initiating streaming data cluster creation based on input parameters, which may be provided by an intended end user. In implementation, this may be effected by a script for generating a list of parameters for generating and implementing a streaming platform. Based on such parameters, the system may automatically generate and initiate message processing for a custom streaming data platform with less time delay and without significant human resources.

More particularly, some aspects described herein may provide a computer-implemented method for generating a streaming platform. The method may include receiving, by a computing device comprising memory and at least one processor, parameter data for generating an event streaming instance, determining, based on the parameter data, at least one availability region and a plurality of availability zones, generating, by the computing device and based on the parameter data, a coordination layer of the event streaming instance comprising a plurality of coordination nodes, generating, by the computing device and based on the parameter data, a streaming layer of the event streaming instance comprising a plurality of streaming layer nodes, generating, by the computing device and based on the parameter data, a serving layer of the event streaming instance comprising a plurality of serving layer nodes, generating, by the computing device and based on the parameter data, a replication layer of the event streaming instance comprising generating a plurality of replication layer, confirming an operation status of each of the coordination layer, the streaming layer, the serving layer, and the replication layer, and initiating message flow to the event streaming instance.

Generating the coordination layer may include generating coordination layer directories for cluster coordination, initiating at least one coordination layer node in each of the determined plurality of availability zones, and starting coordination layer services on each of the coordination layer nodes. The system may generate, by the computing device and based on the parameter data, a streaming layer of the event streaming instance comprising a plurality of streaming layer nodes after a plurality of coordination nodes are determined to be operational. Generating the streaming layer may include generating streaming layer directories, initiating at least one streaming layer node in each of the determined plurality of availability zones, associating at least one streaming system authenticator with each of the plurality of streaming layer nodes, and starting streaming layer services on each of the plurality of streaming layer nodes. Generating, by the computing device and based on the parameter data, a serving layer of the event streaming instance may include generating a plurality of serving layer nodes after the plurality of streaming layer nodes are determined to be operational. Generating the serving layer may include determining identification data for each of the plurality of coordination nodes and identification data for each of the plurality of streaming layer nodes, initiating a plurality of serving layer nodes, generating at least one serving layer resource record and adding the at least one serving layer resource record to a domain name system, associating the at least one streaming system authenticator with each of the plurality of serving layer nodes, associating at least one message schema with each of the plurality of serving layer nodes, and starting serving layer services on each of the plurality of serving layer nodes and updating an operating status each of the plurality of serving layer nodes. Generating, by the computing device and based on the parameter data, a replication layer of the event streaming instance may include generating a plurality of replication layer nodes after the plurality of serving layer nodes are determined to be operational. Generating the replication layer may include determining identification data for each of the plurality of coordination nodes and identification data for each of the plurality of streaming layer nodes, initiating a plurality of replication layer nodes, generating at least one replication layer resource record and adding the at least one replication layer resource record to the domain name system, associating the at least one streaming system authenticator with each of the plurality of replication layer nodes, initiating a replication service on each of the plurality of replication layer nodes, and starting replication layer services on each of the plurality of replication layer nodes and updating an operating status each of the plurality of replication layer nodes.

According to some embodiments, generating streaming system authenticators may include generating a key file for application authentication, starting streaming layer services on each of the plurality of streaming layer nodes may include initiating at least one record of streaming messages, and initiating at least one record of streaming messages may include determining a plurality of message topics, determining, based on the plurality of message topics, a plurality of topic partitions, and assigning at least one of the plurality of topic partitions to each of the plurality of serving layer nodes. According to other embodiments, starting streaming layer services on each of the plurality of streaming layer nodes may include defining access permissions at least one stream user, starting replication layer services on each of the plurality of replication layer nodes may include determining at least two of the plurality of streaming layer nodes for storing each record of streaming messages, and the parameter data may include a location of at least one intended services area, the plurality of availability zones may include at least one availability zone within each of a plurality of determined availability regions, and the plurality of availability zones may include at least one availability zone is provided in the at least one intended services area. According to some other embodiments, the method may include initiating monitoring, by each of plurality of coordination nodes and based on the parameter data, of an operating status of each of the plurality of streaming layer nodes, the monitoring of the operating status may be based on an operating metric determined based on the parameter data, and when the parameter data specifies a high-throughput configuration the method may include estimating a traffic volume of streaming messages, estimating a traffic volume for each streaming layer node, and determining a number streaming layer nodes based on the estimated traffic volume of streaming messages and the estimated traffic volume for each streaming layer node. When the parameter data specifies a low-latency configuration, the method may include estimating a traffic volume of streaming messages, estimating a traffic throughput for each streaming layer node, and determining a number streaming layer nodes based on the estimated traffic volume of streaming messages and the estimated traffic throughput for each streaming layer node.

According to still other embodiments, starting streaming layer services on each of the plurality of streaming layer nodes may include initiating at least one record of streaming messages, starting streaming layer services on each of the plurality of streaming layer nodes may include defining access permissions at least one stream user. The system may determine a plurality of message topics, determine, based on the plurality of message topics, a plurality of topic partitions, and assign at least one of the plurality of topic partitions to each of the plurality of serving layer nodes. The system may also associate at least one streaming system authenticator with each of the plurality of streaming layer nodes, associate the at least one streaming system authenticator with each of the plurality of serving layer nodes, and associate the at least one streaming system authenticator with each of the plurality of replication layer nodes. Starting streaming layer services on each of the plurality of streaming layer nodes may include initiating at least one record of streaming messages and defining access permissions at least one stream user. Each of the plurality of coordination layer nodes may be a Kafka Zookeeper instance. Each of the plurality of streaming layer nodes may be a Kafka Broker instance. Each of the plurality of serving layer node may be a Schema Registry instance. Each of the plurality of replication layer nodes may be a Kafka Connect instance. The coordination nodes may be determined to be operational by receiving traffic from each plurality of coordination nodes port 2181.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure can be practiced. It is to be understood that other embodiments can be utilized and structural and functional modifications can be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for generating a plurality of nodes for a streaming data platform. As discussed further herein, this combination of features may allow for the generation and initiation of a streaming platform that may run in a cloud and may provide multi-availability-zone and multi-region capabilities to support replication and disaster recovery capabilities for data management. The streaming platform may provide reliable message delivery in a cloud network environment. The platform may be generated to provide high availability and be durable in view of updates and changing system needs. The platform may be generated to be resilient within each region and across different regions. The platform that may capable of handling billions of events a day, and may be scalable and fault-tolerant. Such a system may also provide an enterprise-wide platform to stream data in real-time based on custom user configurations, and may produce and consume any number of messages from different downstream applications.

Before discussing these concepts in greater detail, however, several examples of a computing device that may be used in implementing and/or otherwise providing various aspects of the disclosure will first be discussed with respect to FIG. 1.

Figure 1:
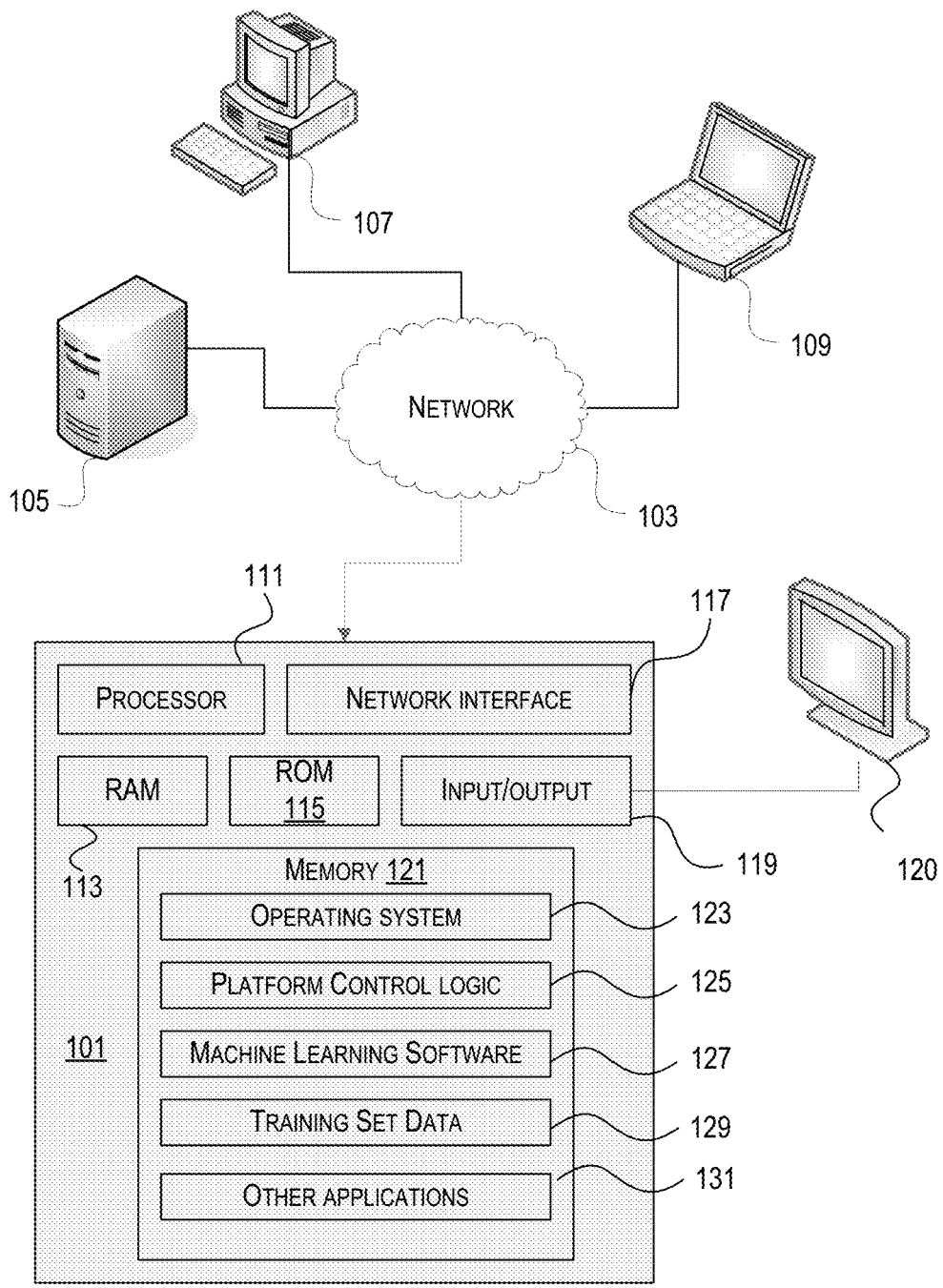
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device

101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, platform control logic 125 for instructing computing device 101 to perform aspects discussed herein, machine learning software 127, training set data 129, and other applications 129. The control logic may include logic for generating a streaming platform in a network environment connected to the computing device 101, and the streaming platform may be generated based on plurality of user parameters received by the computing device 101. Platform control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here. The machine learning software 127 may use streaming platform performance data, which may include the training set data 129 and data determined from other streaming platforms generated by the system, to modify the platform control logic 125.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
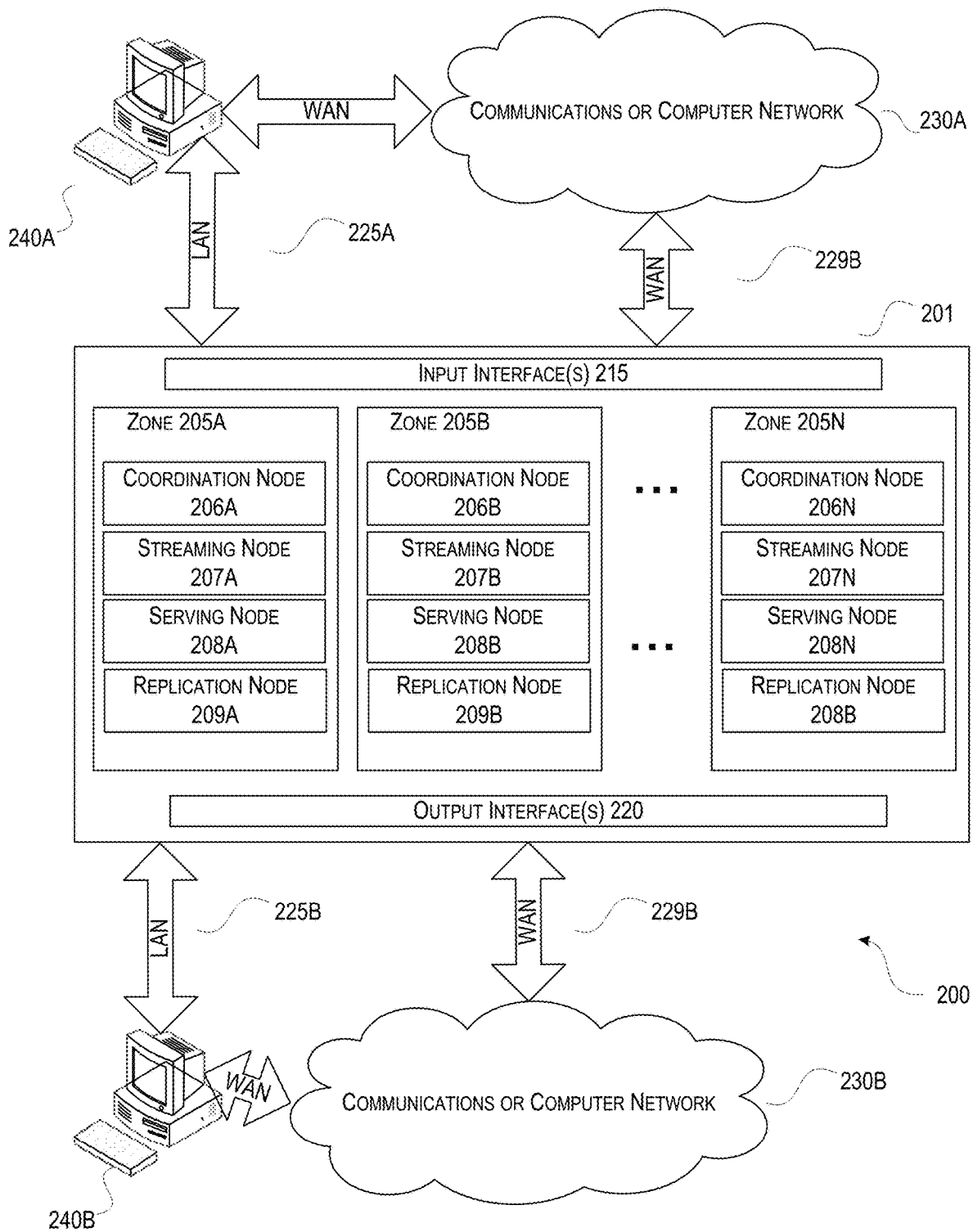
FIG. 2 illustrates an example cloud computing system architecture in accordance with one or more aspects described herein.

With further reference to FIG. 2, one or more aspects described herein may be implemented in a network or cloud application environment and system architecture. FIG. 2 depicts an example system architecture including a network computing device 201 in an illustrative computing environment 200 that may be used according to one or more illustrative aspects described herein. Network computing device 201 may be used as a server in a single-server or multi-server system (e.g., a cloud system) configured to provide network application processing for client devices, and may be used as a distributed cloud system with separate servers in multiple geographic locations. For example, the network computing device 201 may include a plurality of devices, which may be implemented on a commercially available web services, such as Microsoft Azure, Amazon Web Services (AWS), or Google Cloud Platform. Each server may be provided in the same geographic region or at least one web server may be provided in the different geographic region. Each geographic region may include a plurality of availability zones, which may include different power sources and different network connections, such that different availability zones may maintain availability during network attacks against or upgrades to another availability zone. Each server may be provided in the same availability zone or at least one web server may be provided in the different availability zone.

The network computing device 201, and each server thereof, may have a processor for controlling overall operation of the server and its associated components, including RAM, ROM, Input/Output (I/O) module, and memory (not shown). Software may be stored within memory and/or other storage to provide instructions to processor for configuring network computing device 201 into a special purpose computing device in order to perform various functions, such a language processing functions or processing for a machine learning algorithm for message generation, as described herein. For example, memory may store software used by the network computing device 201, such as an operating system, application programs, and an associated database. Network computing device 201 may operate in a networked environment supporting connections to one or more remote computers, such as communication devices 240 (also referred to as terminals or client devices).

The communication devices 240 may be personal computers, mobile devices, laptop computers, virtual assistants, Internet of things (IoT) device (such as web appliances), or servers that include many or all of the elements described above with respect to the computing device 103 or 201. Computing device 201 and/or communication devices 240 may also be mobile terminals (e.g., mobile phones, smartphones, personal digital assistants (PDAs), notebooks, etc.), Voice over Internet Protocol (VoIP) phone devices or terminals, or home computing devices which may be operating as a virtual assistant devices (e.g. Alexa), including various other components, such as a battery, speaker, display screens, and antennas (not shown).

The communications devices may include at least one producer communication device 240A and at least one consumer communication device 240B. The producer communication device 240A may comprise devices that produce data logs, sensor data, data messages and the like, and the network computing device 201 may organize data into a plurality of topics. For example, a producer communication device 240A may include a website user activity tracking data pipeline, which may forward a single data stream or a plurality of data streams, including site activity (page views, searches, or other actions users may take) that may be published to central topics with one topic per activity type. Each topic of data may be split across a plurality of services in the network computing device 201. The consumer communication device 240B may include a web analysis device, which may receive a single data stream or a plurality of data streams. One of the at least one producer communication device 240A and at least one consumer communication device 240B, or another communication device 240, may also act as a platform generation device for receiving system parameters and generating the streaming platform in the network computing device 201.

The communication devices 240 may be connected to the network computing device 201 with network connections. As depicted in FIG. 2, the network connections include a local area network (LAN) 225 and a wide area network (WAN) 229, but may also include other networks. The producer communication device 240A may be coupled to the network computing device 201 with a first LAN 225A or a first WAN 229A, and the consumer communication device 240B may be coupled to the network computing device 201 with a second LAN 225B or a second WAN 229B.

The computing device 201 may be connected to the first LAN 225A or the first WAN 229A through at least one input interface 215, which may include a network interface or adapter. The input interface 215 may provide message buffering, message ordering, and message transmission services. When used in a WAN networking environment, computing device 201 may include a modem or other wide area network interface for establishing communications over the WAN 229, such as communications or computer network(s) 230A. The communications or computer network(s) 230 may include a plurality of communications networks which may be accessed by the computing devices to establish communications between a user and intended communications recipient (e.g., a cellular network, the Internet, a plain old telephone service (POTS), etc.). Similarly, the computing device 201 may be connected to the second LAN 225B or the second WAN 229B through at least one output interface 220. In some situations, a single computing device may act as both the producer communication device 240A and the consumer communication device 240B, and may communicate with the computing device 201 through a single interface. It will be appreciated that the network connections shown are illustrative and other means of establishing a communications link between the devices may be used.

As shown in FIG. 2, one or more communication devices 240 may be in communication with one or more computing device(s) 201. The computing environment 200 may include at least one network appliance(s), such as firewall or gateway devices, installed between the computing device(s) 201 and communication device(s) 240. The network appliance may manage client/server connections and authenticators, and in some cases may provide processing services for a communication device(s) 240.

The communication device(s) 240 may be referred to as a single communication device or a single group of communication device(s) 240. FIG. 2 depicts a source communication device 240A which may function as a data source for the streaming system. The data sources personal computers, mobile devices, laptop computers, virtual assistants, Internet of things (IoT) device (such as web appliances), or servers that include many or all of the elements described above with respect to the computing device 103 or 201.

While computing device(s) 201 may be referred to as a single computing device 201 or a single group of computing device(s) 201, it should be understood that the features of computing device 201 may be distributed across multiple computing devices, possibly in different geographic locations. In one embodiment a single communication device 240 communicates with more than one computing device 201, while in another embodiment a single computing device 201 may communicate with more than one communication devices 240. In yet another embodiment, a single communication device 240 may communicate with a single computing device 201.

The computing device 201 may comprise a plurality of servers in a plurality of isolated zones 205(A-N). The zones 205 may be isolated from each other by, for example, providing each zone in independent network connections and independent power supplies. One or more of the zones may also be provided in different geographic regions. Each zone may be provided with a plurality of different nodes providing different streaming services.

Each zone may include a plurality of nodes, which may include at least one of a coordination layer node 206(A-N), a streaming layer node 207(A-N), a serving layer node 208(A-N), and a replication layer node 209(A-N). A coordination layer node 206 may provide cluster coordination, may generate and store naming and configuration data and may provide synchronization within distributed streaming platform system. A coordination layer node 206 may be generated and installed after the system has verified that a target coordination node cluster is available and online. The coordination layer node 206 may provide failover migration by transferring duties or data from a node that is not responding to another node. The coordination layer node 206 may poll the other nodes in the system to ensure that the nodes are active and responding to communications. The coordination layer node 206 may contain directories for storing data topics in particular streaming layer nodes 207 and access control lists (ACLs) for all topics. The number of coordination layer nodes 206 may be determined based on user entered parameters, and may preferably include an odd number of nodes so that a quorum system may implemented among the plurality of coordination nodes. The platform generation device may be communicate with coordination layer node 206 to determine that the coordination node is functioning, which may be determined by checking traffic on a port, such as port 2181.

A streaming layer node 207 may be generated and installed after the system has verified that a target streaming layer node cluster is available and online. A streaming layer node 207 may provide storage and organization services for designated data topics and/or data partitions. The streaming layer node 207 may be started after at least one coordination node is installed and confirmed to be running. The streaming layer node 207 may receive messages and store the messages in storage devices coupled to the streaming layer node. Each message topic may have a designated streaming layer node 207 that may serve as a leader for particular data topics and/or data partitions. A streaming layer node 207 may also be serve as a follower for particular data topics and/or data partitions, and may store duplicate copies of data. These leader and follower designations may also be stored in one or more coordination layer nodes 206. A leader streaming layer node 207 may transmit data to be replicated to follower streaming layer nodes. A number of streaming layer nodes 207 and number or type of data duplication may be determined based on input data parameters for system generation. A coordination layer node 206 may monitor the status of each of the streaming layer nodes 207 and may designate a new leader streaming layer node upon determination of a failure and may create a new replica streaming layer node for the data stored in a failed streaming layer node.

A serving layer node 208 may be generated and installed after the system has verified that a target serving node cluster is available and online. A serving layer node 208 may provide schema registry storage and services across the streaming platform, and may include a RESTful (Representational State Transfer) interface. A system schema may define a structure of the data format, which may include delimited text files or JavaScript Object Notation (JSON) format for defining data types and protocols. The system may include a plurality of schema which may be stored as a parameter in a table. The serving layer node 208 may store definitions of system schema and may distribute those schema for enforcement throughout the platform to ensure data compatibility based on user parameters. The schema data may include schema compatibility settings and data expanded Avro support.

The system may create and store resource records for the serving layer nodes 208, such as a Domain Name System (DNS), for system nodes and may join the nodes to a created domain. The resource records may include Canonical Name Record (CNAME) or Alias Record. The serving layer node 208 may be initiated with the installation of prerequisite software, which may include JAVA, Datadog for monitoring cloud-scale applications, and AWS CodeDeploy for automating software deployments. The serving layer node 208 may also create and distribute required directories and key files for SSL/SASL authentication based on user parameters.

A replication layer node 209 may be generated and installed after the system has verified that a target replication layer node cluster is available and online. The replication layer node 209 may determine associated coordination layer node 206 and streaming layer node 207 addressing and status information. The system may create and store resource records for the replication layer nodes 209, such as a Domain Name System (DNS), for system nodes and may join the nodes to a created domain. The replication layer node 209 may be initiated with the installation of prerequisite software, which may include JAVA, Datadog, and AWS CodeDeploy. The replication layer node 209 may also create and distribute required directories and key files for SSL/SASL authentication based on user parameters. The user parameters may define a replication factor, which is the number of times the message data is replicated throughout the system. The system may customize and install a replication script in each replication layer node 209, which may store message topic log partition data in each replication layer node 209 for restoration of message data upon a serving layer node 208 failure.

In order to provide fail-over service during node outages or continued service while systems upgrades, each type of node may be provided in at least two different zones, and may also be provided in at least two different regions. Each of the plurality of coordination layer nodes 206 may be a Kafka Zookeeper instance. Each of the plurality of streaming layer nodes 207 may be a Kafka Broker instance. Each of the plurality of serving layer node 208 may be a Schema Registry instance. Each of the plurality of replication layer nodes 209 may be a Kafka Connect instance. The nodes may be determined to be operational by receiving traffic from each plurality of nodes port 2181 used by clients, port 2888 used by peer servers, or port 3888 used for leader election.

Communication devices 240A and 240B may be referenced by any one of the following non-exhaustive terms: communication device(s); mobile device(s); client machine(s); client(s); client computer(s); client device(s); client computing device(s); local machine; remote machine; client node(s); endpoint(s); or endpoint node(s). The computing device 201 may be referenced by any one of the following non-exhaustive terms: server(s), local machine; remote machine; network processer(s), or host computing device(s). Computing device 201 may be configured as any type of server or type of network computing device, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used. The computing device 201 may include applications may include a network or cloud based version of machine learning software 127, and the data 221 may store a larger set of training set data 129, and other applications such as additional streaming platform functions.

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

Having described some example operating environments and example of computing devices which may be used to implement some aspects as discussed further below, discussion will now turn to example methods and systems for generating a streaming platform.

Figure 3:
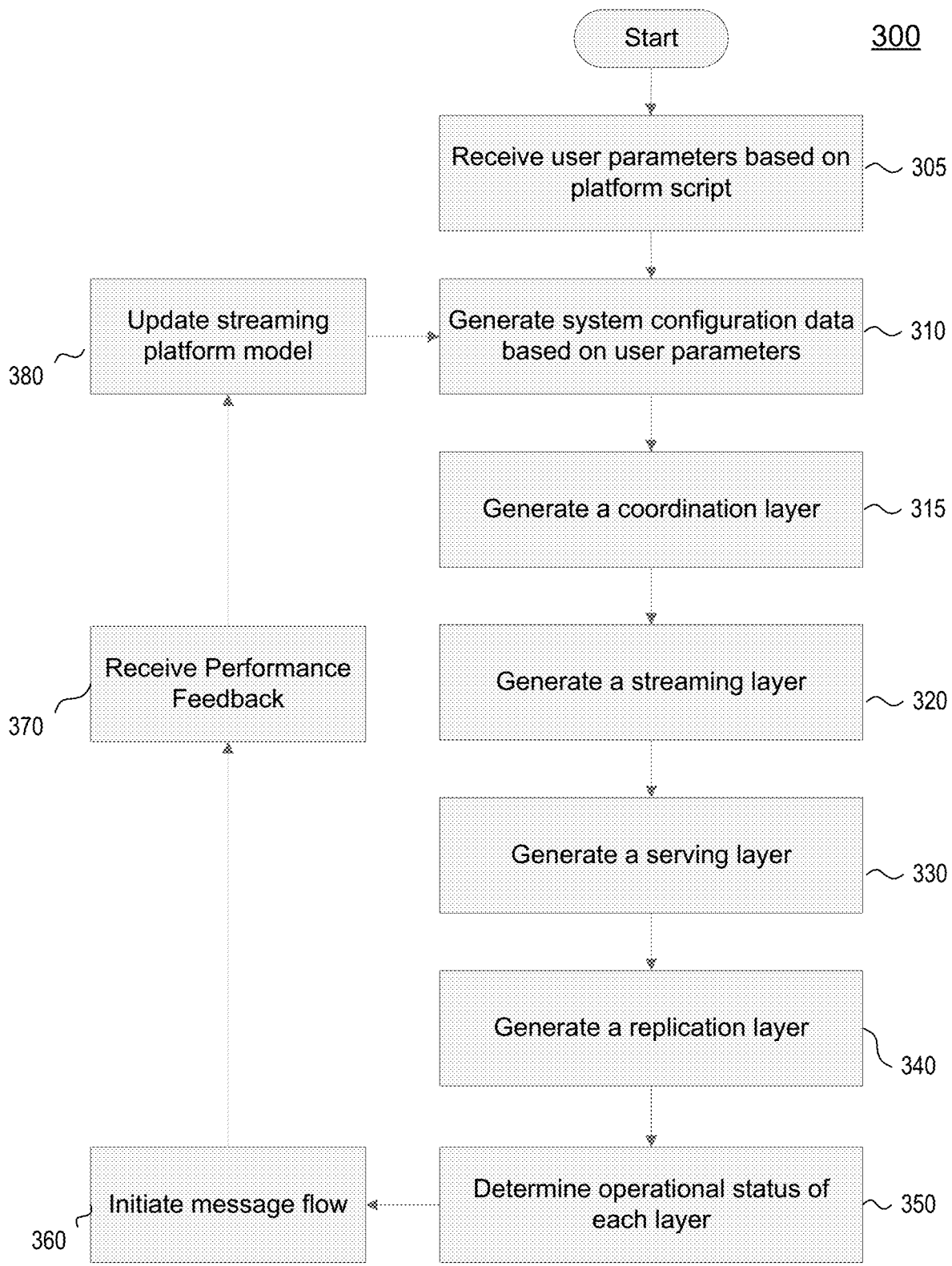
FIG. 3 depicts a flow chart for generating and initiating a streaming platform according to one or more aspects of the disclosure.

FIG. 3 illustrates an example method 300 for generating and initiating a streaming platform in accordance with one or more aspects described herein. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as in platform control logic 125 and machine learning software 127, which may operate on a suitable training set, such as training set data 129.

At step 305, the system may receive user parameters based on platform generation script. The platform generation script may provide a user a plurality of questions regarding the needs and desires related to the architecture and performance requirements for a message streaming platform. At step 310, the system may generate system configuration data based on user parameters. The system may determine a plurality of system configuration data values based on the user parameters. The system may use a streaming platform generation model, which may be based on an evaluation of existing streaming platforms forming training set data 129, to determine a plurality of system parameters and may generate a streaming platform instance based on the determined system parameters. The configuration data values may be used to determine geographic locations for locating plurality of system nodes, a number of independent zones, a quantity of each type of node, quality of service data including throughput speed and volume requirements, a data replication factor, a type of encryption, and data format scheme data.

At step 315, the system may generate, based on the parameter data, a coordination layer of the event streaming instance. The coordination layer may include a plurality of coordination layer nodes. At step 320, the system may generate, based on the parameter data, a streaming layer of the event streaming instance. The streaming layer may include a plurality of streaming layer nodes. The system may generate the streaming layer after a coordination layer, which may include a plurality of coordination layer nodes, is determined to be operational.

At step 330, the system may generate, based on the parameter data, a serving layer of the event streaming instance comprising a plurality of serving layer nodes. The system may generate the streaming layer after a streaming layer, which may include a plurality of streaming nodes, is determined to be operational. At step 340, the system may generate, by the computing device and based on the parameter data, a replication layer of the event streaming instance. The replication layer may include a plurality of replication layer nodes. The system may generate the replication layer after a serving layer, which may include a plurality of serving layer nodes, is determined to be operational.

At step 350, the system may confirm an operation status of each of the coordination layer, the streaming layer, the serving layer, and the replication layer. The system may transmit test messages to each node of each layer, or may initiate data transfer of test data messages to determine data flow through the system and compliance with the system requirements determined from the user parameters. At step 360, the system may initiate message flow to the event streaming instance. The message flow may begin by associating message producing devices, such as communication device 240A, with the streaming platform instance. The system may also initiate connections with data consumer devices, such as communication device 240B, and begin data outflow to the data consumer devices.

At step 370, the system may receive user feedback or system performance feedback based on a plurality of metrics related to an evaluation of message flow to the event streaming instance. The metrics may include path reliability, data throughput, data loss, system latency, or other system defined network metrics. The user feedback or system performance feedback may be used to update the training set data 129 of the system modeling software. At step 380, the system may update the streaming platform generation model, including the training set data 129, based on the performance feedback. The machine leaning software 127 may update the system to generate parameters in keeping with the user feedback or system performance feedback. The machine leaning software 127 may update parameters specific to each of the coordination layer, streaming layer, serving layer, and replication layer based on the updated training set data.

Figure 4:
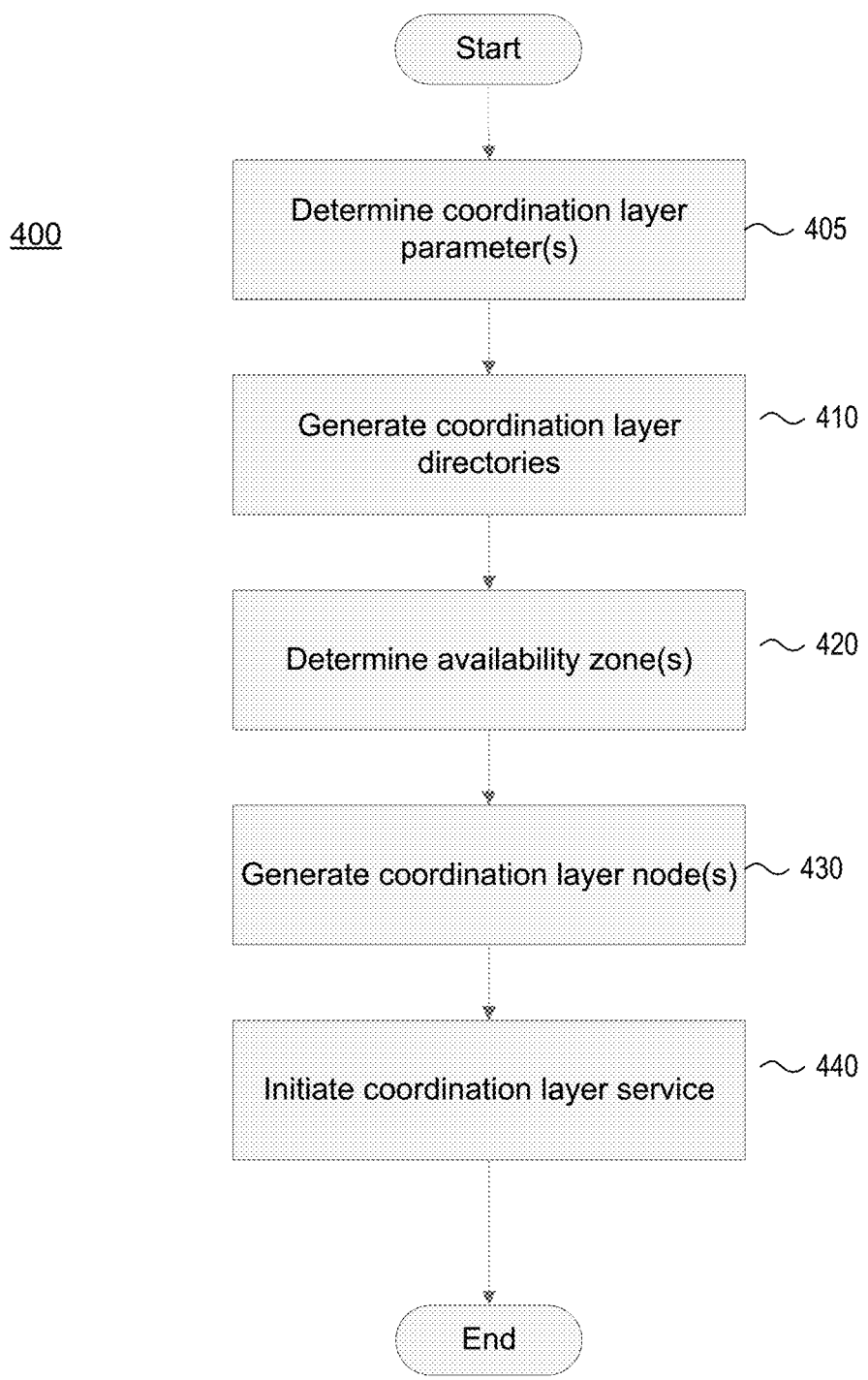
FIG. 4 depicts a flow chart for generating and initiating a plurality of coordination layer nodes to one or more aspects of the disclosure.

FIG. 4 illustrates an example method 400 for generating and initiating a coordination layer of the event streaming instance, which may include a plurality of coordination layer nodes 206 in accordance with one or more aspects described herein. Method 400 may be implemented by a suitable computing system, as described further herein. For example, method 400 may be implemented by any suitable computing environment by a computing device and/or combination of computing devices, such as computing devices 101, 105, 107, and 109 of FIG. 1.

At step 405, the system may determine the parameter(s) for coordination layer generation. The parameters may be used to determine, for example, an estimated traffic volume, an estimated number of data producers, an estimated number of data consumers, may indicate a number of nodes or servers to be initiated as coordination layer nodes. At step 410, the system may generate coordination layer directories for cluster coordination. The coordination layer directories may include store coordination data, with may include node status data, node configuration data, node location data, and access control data. The coordination layer directory data may also include access control lists defining users and allowing/disallowing access of those users to its various platform interfaces.

At step 420, the system may determine the number of availability zones available for service, and may determine the number of availability zones to be used to meet system requirements based on the parameter data. At step 430, the system may generate at least one coordination layer node in each of the determined plurality of availability zones. The coordination layer nodes may be distributed across a minimum number of availability zones determined to meet system stability and reliability based on a determined number of coordination layer nodes. At step 440, the system may initiate coordination layer services on each of the coordination layer nodes. The system may test the running state of each of the coordination layer nodes to ensure the system is functional.

Figure 5:
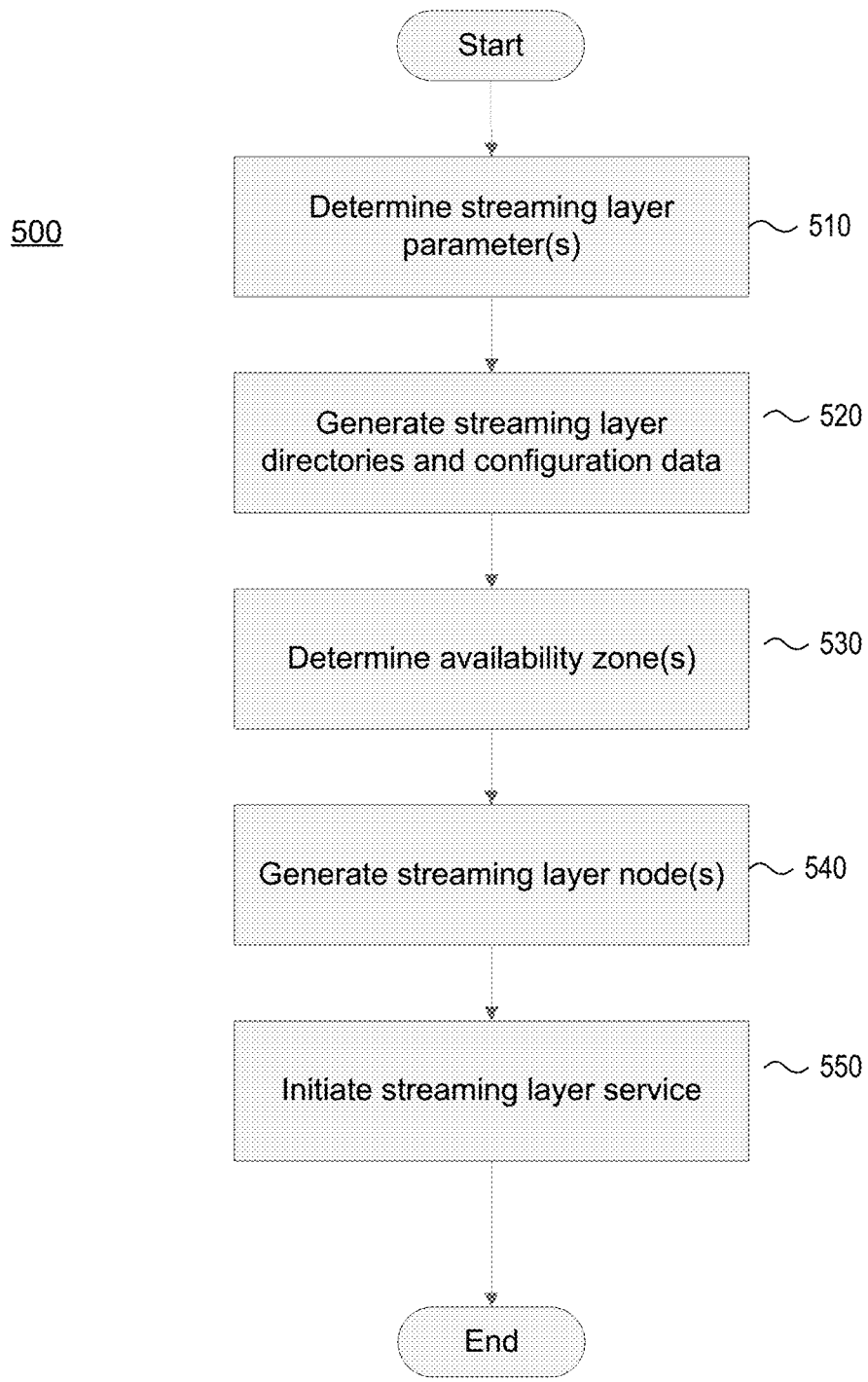
FIG. 5 depicts a flow chart for generating and initiating a plurality of streaming layer nodes according to one or more aspects of the disclosure.

FIG. 5 illustrates an example method 500 for generating and initiating a plurality of replication streaming layer nodes in accordance with one or more aspects described herein. Method 500 may be implemented by a suitable computing system, as described further herein. For example, method 500 may be implemented by any suitable computing environment by a computing device and/or combination of computing devices, such as computing devices 101, 105, 107, and 109 of FIG. 1.

At step 510, the system may determine the parameter(s) for streaming layer generation. The parameters be used to determine, for example, an estimated total data volume, an estimated message size, a data retention length, and a number of nodes or servers to be initiated as coordination layer nodes, and those determinations may be used to determine a number of streaming layer nodes and configuration of streaming layer nodes.

At step 520, the system may generate streaming layer directory and configuration data for the streaming layer nodes. The directory and configuration data may include identification data, port information, message quantity data, buffer data, and limit data that may specify a maximum number of requests, a maximum size of requests, and interval limits. The directory and configuration data may also include data partitioning setting data, replication setting data, retention setting data, and certificate and/or key files for SSL/SASL authentication. At step 530, the system may determine the number of availability zones available for service, and may determine the number of availability zones to be used to meet system requirements based on the parameter data.

At step 540, the system may generate, based on the parameter data, a streaming layer of the event streaming instance, which may include a plurality of streaming layer nodes. The streaming layer may be generated after the coordination layer, which may include a plurality of coordination layer nodes, is determined to be operational. Each streaming layer node may have message handling software installed. Each node may be assigned a message topic, with may include a category or feed name to which records are published. The system may initiate at least one streaming layer node in each of the determined plurality of availability zones. The system may associate at least one streaming system authenticator with each of the plurality of streaming layer nodes. At step 540, the system may initiate broker service on each of the streaming layer nodes. The system may check the broker count and perform system checks on the running state of each of the streaming layer nodes to ensure the system is functional.

Figure 6:
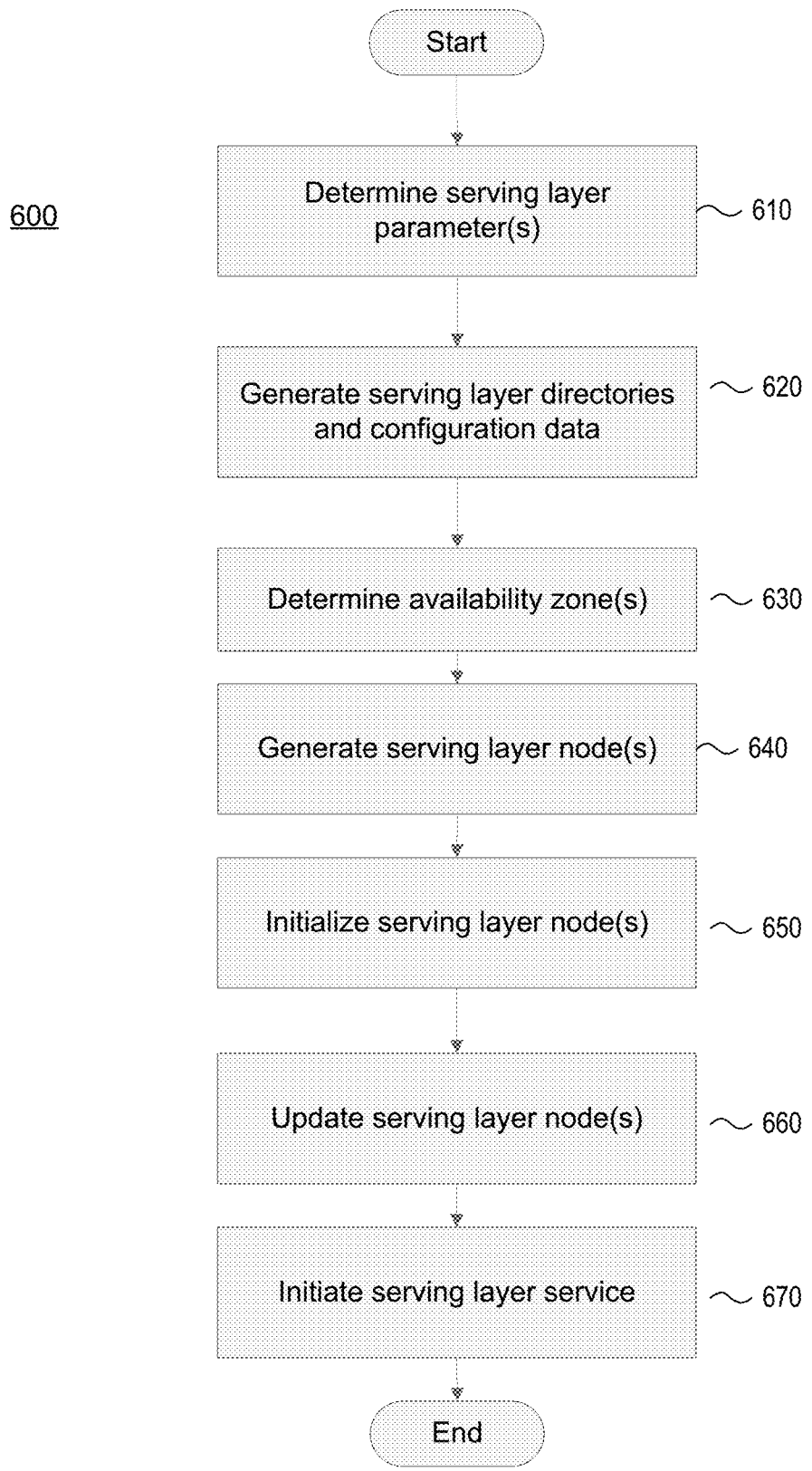
FIG. 6 depicts a flow chart for generating and initiating a plurality of serving layer nodes according to one or more aspects of the disclosure.

FIG. 6 illustrates an example method 600 for generating and initiating a plurality of serving layer nodes in accordance with one or more aspects described herein. Method 600 may be implemented by a suitable computing system, as described further herein. For example, method 600 may be implemented by any suitable computing environment by a computing device and/or combination of computing devices, such as computing devices 101, 105, 107, and 109 of FIG. 1.

At step 610, the system may determine the parameter(s) for serving layer generation. The parameters may include, for example, naming data, schema data, and types of metadata to be generated. At step 620, the system may generate streaming layer directory and configuration data for the streaming layer nodes. The directory and configuration data may include naming data, schema data, compatibility data, types of metadata to be generated, node and cluster identification data, port information, replication setting data, retention setting data, maximum number of requests, a maximum size of requests, interval limits, and certificate and/or key files for SSL/SASL authentication. The directory and configuration data may also include coordination layer node data and streaming layer node data, including node addressing data from a node cluster list. At step 630, the system may determine the number of availability zones available for service, and may determine the number of availability zones to be used to meet system requirements based on the parameter data.

At step 640, the system may generate, based on the parameter data, a serving layer of the event streaming instance. The serving layer may include a plurality of serving layer nodes. The generation of the serving layer may begin after each of the plurality of coordination layer nodes are determined to be operational, and may begin after each of the plurality of streaming layer nodes are determined to be operational. At step 650, the system may initialize a plurality of serving layer nodes, which may include associating at least one message schema with each of the plurality of serving layer nodes. The initialization may include determining and storing addressing and status information for the coordination layer nodes and streaming layer nodes. The system may create and store resource records for the replication layer nodes and install software on each node, which may include JAVA, Datadog, AWS CodeDeploy, and schema registry software. The system may also create and distribute required directories and key files for SSL/SASL authentication to each of the serving layer nodes.

At step 660, system may update the ownership of the installation and configuration files. The update may associate each of the serving layer nodes with each of the coordination layer nodes and the streaming layer nodes. The association may include the exchange of directory data and key files for SSL/SASL authentication.

At step 670, the system may initiate serving layer services on each of the plurality of serving layer nodes. The system may distribute schema data, which may include schema compatibility settings and data expanded Avro support, to each of the coordination layer nodes and each of the streaming layer nodes. The system may update an operating status each of the plurality of serving layer nodes. The operating status may be confirmed to the platform generating system and may be updated with teach of the other nodes in the system.

Figure 7:
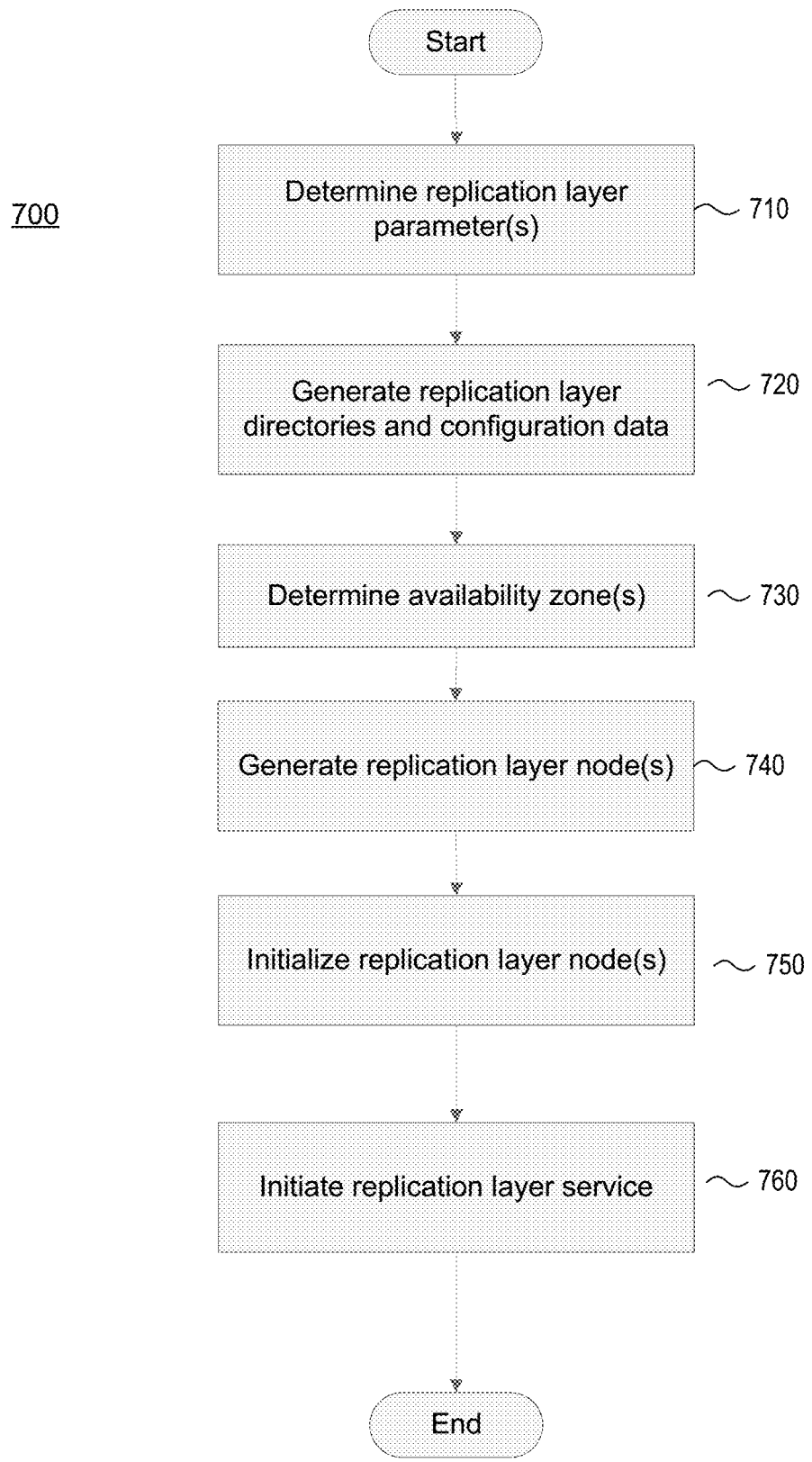
FIG. 7 depicts a flow chart for generating and initiating a plurality of replication layer nodes according to one or more aspects of the disclosure.

FIG. 7 illustrates an example method 700 for generating and initiating a plurality of replication layer nodes in accordance with one or more aspects described herein. Method 700 may be implemented by a suitable computing system, as described further herein. For example, method 700 may be implemented by any suitable computing environment by a computing device and/or combination of computing devices, such as computing devices 101, 105, 107, and 109 of FIG. 1.

In step 710, the system may determine the parameter(s) for replication layer generation. The parameters may include, for example, naming data, schema data, topic and partition data, replication factor data. The parameters may also include data identifying data producers and data consumers. At step 720, the system may generate replication layer directory and configuration data for the replication layer nodes. The directory data may include a list of coordination layer nodes and streaming layer nodes. The directory and configuration data may include naming data, schema data, compatibility data, node and cluster identification data, port information, replication setting data, retention setting data, and certificate and/or key files for SSL/SASL authentication. The directory and configuration data may also include connection and replication data for connecting data producers and data consumers to the streaming layer nodes, and may be used to control data distribution and data replication among the plurality of streaming layer nodes. At step 730, the system may determine the number of availability zones available for service, and may determine the number of availability zones to be used to meet system requirements based on the parameter data. The availability zones may be determined based on the availability zones associated with the streaming layer nodes.

At step 740, the system may generate, based on the parameter data, a serving layer of the event streaming instance. The serving layer may include a plurality of serving layer nodes. The generation of the serving layer may begin after each of the plurality of coordination layer nodes are determined to be operational, may begin after each of the plurality of streaming layer nodes are determined to be operational, and may begin after each of the plurality of serving layer nodes are determined to be operational.

At step 750, the system may initialize a plurality of replication layer nodes, which may include installing a custom replication script in each replication layer node 209. The initialization may include determining and storing addressing and status information for the coordination layer nodes and streaming layer nodes. The system may create and store resource records for the replication layer nodes and install software on each node, which may include JAVA, Datadog, AWS CodeDeploy, and schema registry software. The system may also create and distribute required directories and key files for SSL/SASL authentication to each of the replication layer nodes. The custom replication script in each replication layer nodes may direct the storage and/or replication of message data in each replication layer node 209. The script may also direct the restoration of message data upon a serving layer node 208 failure.

At step 750, the system may initialize a plurality of serving layer nodes, which may include associating at least one message schema with each of the plurality of serving layer nodes. The initialization may include determining and storing addressing and status information for the coordination layer nodes and streaming layer nodes. The system may create and store resource records for the replication nodes and install software on each node, which may include JAVA, Datadog, AWS CodeDeploy, and schema registry software. The system may also create and distribute required directories and key files for SSL/SASL authentication to each of the serving layer nodes.

At step 760, system may initialize the replication layer nodes and update the ownership of the installation and configuration files. The update may include initiating connection services for streaming data storage and data replication. The update may associate each of the replication layer nodes with each of the coordination layer nodes and the streaming layer nodes. The association may include the exchange of directory data and key files for SSL/SASL authentication.

At step 770, the system may starting replication layer services on each of the plurality of replication layer nodes and updating an operating status each of the plurality of replication layer nodes. The system may update operating status each of the plurality of replication layer nodes. The operating status may be confirmed to the platform generating system and may be updated with teach of the other nodes in the system.

Some aspects described herein may provide benefits for handing large amounts of message data, such as: lowering the cost associated with generating a streaming data platform and improving the efficiency of custom streaming platforms by creating platform based on define user parameters.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules can be written in a source code programming language that is subsequently compiled for execution, or can be written in a scripting language such as (but not limited to) HTML or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a control processing system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A streaming data infrastructure automation method comprising:
   receiving, by a computing device comprising memory and at least one processor, parameter data for generating an event streaming instance;
   determining, based on the parameter data, at least one availability region and a plurality of availability zones;
   generating, by the computing device and based on the parameter data, a coordination layer of the event streaming instance comprising a plurality of coordination layer nodes, wherein generating the coordination layer comprises:
   generating coordination layer directories for cluster coordination;
   initiating at least one coordination layer node in each of the determined plurality of availability zones; and
   starting coordination layer services on each of the plurality of coordination layer nodes;
   after the plurality of coordination layer nodes are determined to be operational, generating, by the computing device and based on the parameter data, a streaming layer of the event streaming instance comprising a plurality of streaming layer nodes, wherein generating the streaming layer comprises:

generating streaming layer directories;
initiating at least one streaming layer node in each of the determined plurality of availability zones;
associating at least one streaming system authenticator with each of the plurality of streaming layer nodes; and
starting streaming layer services on each of the plurality of streaming layer nodes;
after the plurality of streaming layer nodes are determined to be operational, generating, by the computing device and based on the parameter data, a serving layer of the event streaming instance comprising a plurality of serving layer nodes, wherein generating the serving layer comprises:
determining identification data for each of the plurality of coordination layer nodes and identification data for each of the plurality of streaming layer nodes;
initiating a plurality of serving layer nodes;
generating at least one serving layer resource record and adding the at least one serving layer resource record to a domain name system;
associating the at least one streaming system authenticator with each of the plurality of serving layer nodes;
associating at least one message schema with each of the plurality of serving layer nodes; and
starting serving layer services on each of the plurality of serving layer nodes and updating an operating status each of the plurality of serving layer nodes;
after the plurality of serving layer nodes are determined to be operational, generating, by the computing device and based on the parameter data, a replication layer of the event streaming instance comprising a plurality of replication layer nodes, wherein generating the replication layer comprises:
determining identification data for each of the plurality of coordination layer nodes and identification data for each of the plurality of streaming layer nodes;
initiating a plurality of replication layer nodes;
generating at least one replication layer resource record and adding the at least one replication layer resource record to the domain name system;
associating the at least one streaming system authenticator with each of the plurality of replication layer nodes;
initiating a replication service on each of the plurality of replication layer nodes; and
starting replication layer services on each of the plurality of replication layer nodes and updating an operating status each of the plurality of replication layer nodes;
confirming an operation status of each of the coordination layer, the streaming layer, the serving layer, and the replication layer; and
initiating message flow to the event streaming instance.

2. The method of claim 1, wherein generating streaming system authenticators comprises generating a key file for application authentication.

3. The method of claim 1, wherein starting streaming layer services on each of the plurality of streaming layer nodes comprises initiating at least one record of streaming messages.

4. The method of claim 3, wherein initiating at least one record of streaming messages comprises:
determining a plurality of message topics;
determining, based on the plurality of message topics, a plurality of topic partitions; and
assigning at least one of the plurality of topic partitions to each of the plurality of serving layer nodes.

5. The method of claim 1, wherein starting streaming layer services on each of the plurality of streaming layer nodes comprises defining access permissions at least one stream user.

6. The method of claim 1, wherein the parameter data comprises a location of at least one intended services area,
wherein the plurality of availability zones comprises at least one availability zone within each of a plurality of determined availability regions, and
wherein the plurality of availability zones comprises at least one availability zone is provided in the at least one intended services area.

7. The method of claim 1, wherein starting replication layer services on each of the plurality of replication layer nodes comprises determining at least two of the plurality of streaming layer nodes for storing each record of streaming messages.

8. The method of claim 1, further comprising:
initiating monitoring, by each of plurality of coordination layer nodes and based on the parameter data, of an operating status of each of the plurality of streaming layer nodes,
wherein the monitoring of the operating status is based on an operating metric determined based on the parameter data.

9. The method of claim 1, wherein the parameter data specifies a high-throughput configuration, the method further comprising:
estimating a traffic volume of streaming messages; and
estimating a traffic volume for each streaming layer node; and
determining a number streaming layer nodes based on the estimated traffic volume of streaming messages and the estimated traffic volume for each streaming layer node.

10. The method of claim 1, wherein the parameter data specifies a low-latency configuration, the method further comprising:
estimating a traffic volume of streaming messages;
estimating a traffic throughput for each streaming layer node; and
determining a number streaming layer nodes based on the estimated traffic volume of streaming messages and the estimated traffic throughput for each streaming layer node.

11. An apparatus comprising:
one or more processors;
at least one communications interface with a cloud computing service; and
memory comprising instructions that, when executed by the one or more processors, cause the apparatus to:
receive parameter data for generating an event streaming instance;
generate, based on the parameter data and in the cloud computing service, a coordination layer of the event streaming instance comprising a plurality of coordination layer nodes, wherein generating the coordination layer comprises:
generating coordination layer directories for cluster coordination,
initiating at least one coordination layer node, and
starting coordination layer services on each of the plurality of coordination layer nodes;
generate, based on the parameter data and in the cloud computing service, a streaming layer of the event streaming instance comprising a plurality of streaming layer nodes, wherein generating the streaming layer comprises:
generating streaming layer directories,
initiating the plurality of streaming layer nodes,
associating at least one streaming system authenticator with each of the plurality of streaming layer nodes, and
starting streaming layer services on each of the plurality of streaming layer nodes;
generate, based on the parameter data and in the cloud computing service, a serving layer of the event streaming instance comprising a plurality of serving layer nodes, wherein generating the serving layer comprises:
determining identification data for each of the plurality of coordination layer nodes and identification data for each of the plurality of streaming layer nodes,
initiating a plurality of serving layer nodes,
generating at least one serving layer resource record and adding the at least one serving layer resource record to a domain name system,
associating the at least one streaming system authenticator with each of the plurality of serving layer nodes,
associating at least one message schema with each of the plurality of serving layer nodes, and
starting serving layer services on each of the plurality of serving layer nodes and updating a first operating status of each of the plurality of serving layer nodes;
generate, based on the parameter data and in the cloud computing service, a replication layer of the event streaming instance comprising a plurality of replication layer nodes, wherein generating the replication layer comprises:
determining identification data for each of the plurality of coordination layer nodes and identification data for each of the plurality of streaming layer nodes,
initiating the plurality of replication layer nodes,
generating at least one replication layer resource record and adding the at least one replication layer resource record to the domain name system,
associating the at least one streaming system authenticator with each of the plurality of replication layer nodes,
initiating a replication service on each of the plurality of replication layer nodes, and
starting replication layer services on each of the plurality of replication layer nodes and updating a second operating status of each of the plurality of replication layer nodes;
confirm one or more operating statuses of each of the coordination layer, the streaming layer, the serving layer, and the replication layer of the event streaming instance; and
initiate message flow to the event streaming instance.

12. The apparatus of claim 11, wherein starting streaming layer services on each of the plurality of streaming layer nodes comprises initiating at least one record of streaming messages.

13. The apparatus of claim 11, wherein starting streaming layer services on each of the plurality of streaming layer nodes comprises defining access permissions at least one stream user.

14. The apparatus of claim 11, wherein the parameter data specifies a high-throughput configuration, and the instructions, when executed, cause the apparatus to:
estimate a traffic volume of streaming messages; and
estimate a traffic volume for each streaming layer node; and
determine a number streaming layer nodes based on the estimated traffic volume of streaming messages and the estimated traffic volume for each streaming layer node.

15. The apparatus of claim 11, wherein the parameter data specifies a low latency configuration, and the instructions, when executed, cause the apparatus to:
estimate a traffic volume of streaming messages;
estimate a traffic throughput for each streaming layer node; and
determine a number streaming layer nodes based on the estimated traffic volume of streaming messages and the estimated traffic throughput for each streaming layer node.

16. The apparatus of claim 11, wherein the instructions, when executed, cause the apparatus to:
determine a plurality of message topics;
determine, based on the plurality of message topics, a plurality of topic partitions; and
assign at least one of the plurality of topic partitions to each of the plurality of serving layer nodes.

17. One or more non-transitory computer-readable media comprising instructions that, when executed by a computing system, cause the computing system to:
receive parameter data for generating an event streaming instance;
generate, based on the parameter data and in a cloud computing service, a coordination layer of the event streaming instance comprising a plurality of coordination layer nodes, wherein generating the coordination layer comprises:
generating coordination layer directories for cluster coordination;
initiating at least one coordination layer node; and
starting coordination layer services on each of the plurality of coordination layer nodes;
generate, based on the parameter data and in the cloud computing service, a streaming layer of the event streaming instance comprising a plurality of streaming layer nodes, wherein generating the streaming layer comprises:
generating streaming layer directories;
initiating the plurality of streaming layer nodes;
starting streaming layer services on each of the plurality of streaming layer nodes;
generate, based on the parameter data and in the cloud computing service, a serving layer of the event streaming instance comprising a plurality of serving layer nodes, wherein generating the serving layer comprises:
determining identification data for each of the plurality of coordination layer nodes and identification data for each of the plurality of streaming layer nodes;
initiating a plurality of serving layer nodes;
generating at least one serving layer resource record and adding the at least one serving layer resource record to a domain name system;
associating at least one message schema with each of the plurality of serving layer nodes; and
starting serving layer services on each of the plurality of serving layer nodes and updating a first operating status of each of the plurality of serving layer nodes;

generate, based on the parameter data and in the cloud computing service, a replication layer of the event streaming instance comprising a plurality of replication layer nodes, wherein generating the replication layer comprises:
  determining identification data for each of the plurality of coordination layer nodes and identification data for each of the plurality of streaming layer nodes,
  initiating the plurality of replication layer nodes;
  generating at least one replication layer resource record and adding the at least one replication layer resource record to the domain name system;
  initiating a replication service on each of the plurality of replication layer nodes; and
  starting replication layer services on each of the plurality of replication layer nodes and updating a second operating status of each of the plurality of replication layer nodes;
confirm one or more operating statuses of each of the coordination layer, the streaming layer, the serving layer, and the replication layer of the event streaming instance; and
initiate message flow to the event streaming instance.

18. The one or more non-transitory computer-readable media of claim 17, further comprising instructions that cause the computing system to:
  associate at least one streaming system authenticator with each of the plurality of streaming layer nodes;
  associate the at least one streaming system authenticator with each of the plurality of serving layer nodes; and
  associate the at least one streaming system authenticator with each of the plurality of replication layer nodes.

19. The one or more non-transitory computer-readable media of claim 17, wherein starting streaming layer services on each of the plurality of streaming layer nodes comprises initiating at least one record of streaming messages and defining access permissions at least one stream user.

20. The one or more non-transitory computer-readable media of claim 17, further comprising instructions that cause the computing system to:
  determine a plurality of message topics;
  determine, based on the plurality of message topics, a plurality of topic partitions; and
  assign at least one of the plurality of topic partitions to each of the plurality of serving layer nodes.

\* \* \* \* \*